(12) United States Patent
Carlson et al.

(10) Patent No.: US 7,288,591 B2
(45) Date of Patent: Oct. 30, 2007

(54) CURABLE DISPERSANTS

(75) Inventors: James G. Carlson, Lake Elmo, MN (US); Jennifer L. Lee, Eagan, MN (US); William J. Hunt, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 499 days.

(21) Appl. No.: 10/489,983

(22) PCT Filed: Sep. 25, 2002

(86) PCT No.: PCT/US02/30383

§ 371 (c)(1), (2), (4) Date: Mar. 17, 2004

(87) PCT Pub. No.: WO03/027162

PCT Pub. Date: Apr. 3, 2003

(65) Prior Publication Data

US 2004/0242727 A1 Dec. 2, 2004

(51) Int. Cl.
C08G 18/72 (2006.01)
C08G 18/28 (2006.01)
C09D 11/02 (2006.01)

(52) U.S. Cl. .................. 524/589; 523/160; 524/590
(58) Field of Classification Search ............ 523/160, 523/161
See application file for complete search history.

(56) References Cited

U.S. PATENT DOCUMENTS

| | | |
|---|---|---|
| 4,496,686 A | 1/1985 | Ansel |
| 4,647,647 A | 3/1987 | Haubennestel et al. |
| 4,673,705 A | 6/1987 | Ansel et al. |
| 4,687,709 A | 8/1987 | Brinkmeyer et al. |
| 4,754,056 A | 6/1988 | Ansel et al. |
| 4,762,752 A | 8/1988 | Haubennestel et al. |
| 4,942,213 A | 7/1990 | Haubennestel et al. |
| 5,178,952 A * | 1/1993 | Yamamoto et al. ...... 428/425.8 |
| 5,275,646 A | 1/1994 | Marshall et al. |
| 5,362,773 A | 11/1994 | Brindoepke et al. |
| 5,399,294 A | 3/1995 | Quednau |
| 5,425,900 A | 6/1995 | Quednau |
| 5,462,768 A | 10/1995 | Adkins et al. |
| 5,530,064 A | 6/1996 | Ashton et al. |
| 5,578,673 A | 11/1996 | Ashton et al. |
| 5,684,081 A | 11/1997 | Damhorn et al. |
| 5,703,141 A | 12/1997 | Jin |
| 5,882,393 A | 3/1999 | Quednau et al. |
| 6,136,890 A | 10/2000 | Carlson et al. |
| 6,207,744 B1 * | 3/2001 | Paulus et al. ................ 524/507 |
| 6,467,897 B1 | 10/2002 | Wu et al. |
| 6,513,897 B2 | 2/2003 | Tokie |
| 6,534,128 B1 | 3/2003 | Carlson et al. |
| 6,558,753 B1 | 5/2003 | Ylitalo et al. |
| 2002/0086914 A1 | 7/2002 | Lee et al. |
| 2002/0128340 A1 | 9/2002 | Young et al. |
| 2003/0083396 A1 | 5/2003 | Ylitalo et al. |
| 2003/0092833 A1* | 5/2003 | Frieling et al. ............. 524/589 |

FOREIGN PATENT DOCUMENTS

| | | |
|---|---|---|
| DE | 197 05 219 | 8/1998 |
| EP | 0 729 831 | 9/1996 |
| EP | 0 788 029 | 8/1997 |
| JP | 2000-95992 | 4/2000 |
| WO | WO99/41320 | 8/1999 |
| WO | WO 00/20521 | 4/2000 |

OTHER PUBLICATIONS

Kirk-Othmer, *Encyclopedia of Chemical Technology*, 4th ed., vol. 24, pp. 695-726, John Wiley & Sons, NY, 1998.

* cited by examiner

*Primary Examiner*—Callie Shosho
(74) *Attorney, Agent, or Firm*—Colene H. Blank

(57) ABSTRACT

Described is a curable dispersant, inks or coating including the curable dispersant, and articles comprising a substrate and the inks or coatings that include the curable dispersant.

18 Claims, No Drawings

CURABLE DISPERSANTS

FIELD OF THE INVENTION

The present invention relates to dispersants used in inks and coatings. More particularly, the present invention relates to radiation curable dispersants to be used in pigmented, radiation curable inks and coatings.

BACKGROUND OF INVENTION

Pigmented inks and coatings, after being applied to substrates and cured, are preferably desired to cure effectively and have good cured film properties, such as hardness etc. However, some properties of, or ingredients in, the curable, pigmented inks and coatings themselves may actually hinder the ability of the inks and coatings to exhibit good cured film properties.

For example, in order for curable inks and coatings to be applied to substrates, they usually have relatively low viscosity before they are cured. In order to meet this low viscosity requirement, for example, in ink jettable inks, high levels of monoacrylates are usually included. The high level of monoacrylates, however, makes it harder to achieve good cured film properties.

For another example, in inks and some coatings, the presence of the pigment particles makes it difficult to penetrate the inks and coatings with the radiation that is necessary to cure the inks and coatings. This may result in poor cured film properties, such as the ink or coating being tacky or easily marred. Attempts have been made to allow better penetration of inks and coatings by radiation for curing purposes by including high levels of diluents and/or conventional dispersants in the inks and coating suspensions that disperse or spread out the pigment particles. Diluents are used to reduce the concentration of an ink or coating to achieve a desirable or beneficial effect. Conventional dispersants, generally, are used to stabilize pigment-containing ink or coating dispersions to prevent agglomeration or flocculation of the pigment particles and consequent settling of the pigment particles out of the dispersions. High levels of diluents and/or conventional dispersants in inks or coatings that may be necessary to disperse or spread out the pigment particles, however, tend to act as plasticizers and, therefore, contribute to poor cured film properties.

Thus, a need exists for pigmented inks and coatings, wherein the pigment is well dispersed, that after being applied to substrates and cured, have good cured film properties, such as non-tackiness and mar-resistance.

SUMMARY OF INVENTION

The inventors found that using the inventive composition, which is a curable dispersant, in pigmented, radiation curable inks and/or coatings allows the inks and coatings, once applied to a substrate and exposed to a curing means, to exhibit good cured film properties, such as non-tackiness and mar-resistance. Since a dispersant is commonly used in inks and coatings, using a curable dispersant serves at least two functions, which include acting as a dispersant for pigment particles and acting as a means to effect good cured film properties. A surprisingly small amount of radiation curable groups included in the curable dispersant results in a disproportionately large improvement in the cure of the ink or coating in which the curable dispersant is used.

The present inventive composition or dispersant provides inks and coatings with good adhesion after curing to a wide range of substrates. The present inventive composition, or dispersant, may be used in inks and coatings, such as, for examples, screen print inks, ink jettable inks, or radiation curable coatings containing pigment particles.

An embodiment of the present invention is a composition comprising the reaction product of: a) a polyisocyanate; b) at least one radiation curable oligomer, comprising at least one radiation curable group, wherein said oligomer has a molecular weight of greater than about 1000 grams per mole; and c) at least one polar component comprising at least one isocyanate-reactive group and at least one polar group. The radiation curable oligomer may comprise a radiation curable group, an isocyanate reactive group and a linking group, wherein the linking group links the radiation curable group and the isocyanate reactive group. Furthermore, the radiation curable oligomer may be a mixture of oligomers provided there is at least one radiation curable group.

Yet another embodiment comprises a composition comprising the reaction product of: a) a polyisocyanate; b) at least one radiation curable oligomer, comprising at least one radiation curable group, an isocyanate-reactive group and a linking group, wherein the linking group links the radiation curable group and the isocyanate-reactive group wherein said oligomer has a molecular weight of greater than about 1000 grams per mole; and c) at least one polar component comprising at least one isocyanate-reactive group and at least one polar group. Furthermore, the radiation curable oligomer b) may be a component of a mixture of oligomers, some components of which do not have both isocyanate-reactive and radiation curable groups.

Another embodiment is a composition comprising a high molecular weight polycaprolactone acrylate represented in the following structure:

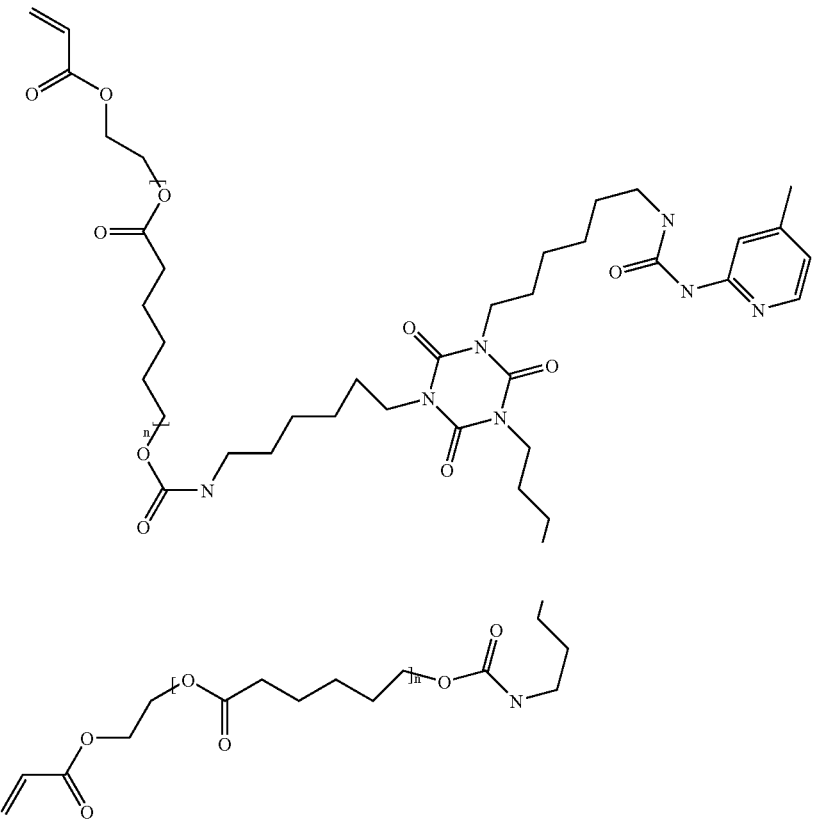

Yet another embodiment is a radiation curable, pigmented ink or coating comprising: a) a composition comprising the reaction product of: i) a polyisocyanate; ii) at least one radiation curable oligomer, comprising at least one radiation curable group, wherein said oligomer has a molecular weight of greater than about 1000 grams per mole; and iii) at least one polar component comprising at least one isocyanate-reactive group and at least one polar group; b) pigment particles; and c) at least one reactive diluent. The radiation curable oligomer may comprise a radiation curable group, an isocyanate reactive group and a linking group, wherein the linking group links the radiation curable group and the isocyanate reactive group. Furthermore, the radiation curable oligomer may be a mixture of oligomers provided there is at least one radiation curable group.

A further embodiment is a dispersant for use in ink jettable ink, said dispersant comprising at least one radiation curable group and at least one polar group.

Another embodiment is an ink jettable ink comprising: a) a dispersant comprising at least one radiation curable group and at least one polar group; b) pigments particles; and c) at least one reactive diluent.

Yet another embodiment is an article comprising the ink or coating described above, which is applied to a substrate and exposed to a curing means.

A further embodiment is an article comprising the ink jettable ink described above, which is applied to a substrate and exposed to a curing means.

Additional embodiments of the invention are disclosed herein.

DESCRIPTION OF THE PREFERRED EMBODIMENT(S)

The present invention provides a composition comprising the reaction product of a polyisocyanate, one or more radiation curable oligomers having one isocyanate-reactive group, at least one polar component having at least one isocyanate-reactive group, optionally a difunctional material having two isocyanate-reactive groups, and optionally a monofunctional material having one isocyanate-reactive group. The present invention also provides pigmented, radiation curable inks and coatings comprising the inventive composition, pigments particles and at least one reactive diluent. Although the inventive composition may be used as a dispersant in pigmented, radiation curable inks and coatings in general, one particular use of the composition is as a dispersant in ink jettable inks (which are inks that are suitable for ink jetting applications) (See U.S. Pat. No. 5,275,646 (Marshall et al.)). The present invention also includes articles that include the inventive dispersant in an ink or coating that is coated on at least a portion of a substrate.

Composition

Polyisocyanate

The polyisocyanate of the inventive composition comprises more than one isocyanate group.

The polyisocyanate of the inventive composition may be one of numerous polyisocyanates. A preferred class of polyisocyanates may be represented by the formula:

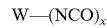

wherein W is a linking group. The linking group may comprise an alkyl group, an aryl group, an aralkyl group, a cyclic group, or a heterocyclic group, for examples. W generally comprises from about 6 to about 40 carbon atoms and optionally may comprise one or more heteroatoms. The heteroatom(s) may be independently selected from the group consisting of nitrogen, sulfur, oxygen, and phosphorus. Additionally, x is about 2 to about 5, and x is preferably 3.

Suitable polyisocyanates include, but are not limited to: trimers of hexamethylene diisocyanate such as "TOLONATE™ HDT" and "TOLONATE™ HDT-LV" from Rhodia Corporation (Cranbury, N.J.), and "DESMODUR™ N-3300" and "DESMODUR™ N-3600" from Bayer Corporation (Pittsburgh, Pa.), a biuret of an aliphatic diisocyanate such as hexamethylene diisocyanate biuret sold for example under the tradenames "TOLONATE™ HDB-LV" from Rhodia Corporation, and trimers of isophorone diioscyanate. Other polyisocyanate components useful in the present invention include aliphatic diisocyanates containing uretdione (dimer) groups, mixtures of dimer and trimer groups (for example "DESMODUR™ N-3400" from Bayer Corporation), and allophanate groups. Other useful polyisocyanates are "DESMODUR™ TPLS 2294" (from Bayer Corporation) and the like, which comprise an asymmetric trimer of hexamethylene diisocyanate. Aromatic polyisocyanates such as trimers of toluene diisocyanate, triphenylmethane triisocyanate, polymeric diphenylmethanediisocyanate and the like are also suitable. Adducts of diisocyanates with diols and triols sold commercially under various tradenames are also suitable as the polyisocyanate of the inventive composition.

Suitable diisocyanates include, but are not limited to, isophorone diisocyanate, 2,2,4-trimethyl hexamethylene diioscyanate, 2,4,4-trimethyl hexamethylene diioscyanate, 4,4'-methylenebis(cyclohexyl isocyanate), commonly referred to as "H$_{12}$MDI" and sold under the tradename "DESMODUR™ W" and sold by Bayer Corporation, diphenylmethane diisocyanate, toluene dissocyanate, and naphthalene diisocyanate.

Preferably the polyisocyanate is liquid at room temperature.

One particularly preferred polyisocyanate is the hexamethylene diisocyanate trimer, known as "TOLONATE™ HDT-LV". The structure of this polyisocyanate is as follows:

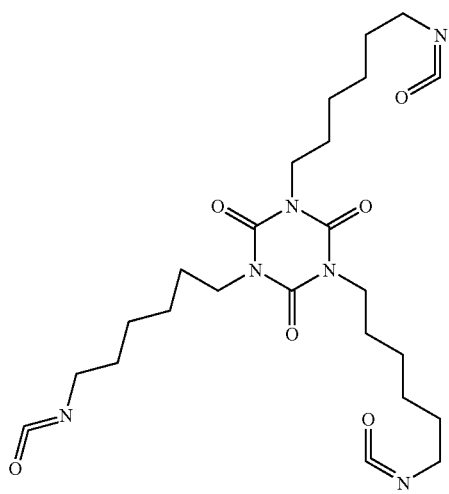

Radiation Curable Oligomer

The radiation curable oligomer(s) of the inventive composition comprises at least one radiation curable group, one isocyanate-reactive group, and a linking group that links said at least one radiation curable group and said isocyanate-reactive group. An isocyanate-reactive group is a group that reacts with an isocyanate. Additionally, the radiation curable oligomer has a molecular weight greater than about 1000 grams per mole, preferably greater than about 1500 grams per mole, most preferably from about 2000 to about 5000 grams per mole.

The radiation curable group of the radiation curable oligomer is preferably (meth)acrylate. The term (meth)acrylate, as used herein, encompasses acrylate and/or methacrylate. Other radiation curable groups besides (meth)acrylate may be used in the present invention, however. Representative examples of radiation curable groups suitable in the practice of the present invention include, but are not limited to, (meth)acrylate groups, epoxy groups, olefinic carbon-carbon double bonds, allyloxy groups, alpha-ethyl styrene groups, (meth)acrylamide groups, cyanate ester groups, vinyl ether groups, combinations of these, and the like.

The isocyanate-reactive group of the oligomer reacts with an isocyanate group of the polyisocyanate. Examples of isocyanate-reactive groups are an alcohol group (OH), an amino group (NH$_2$) and a thiol group (SH). Preferably, the isocyanate-reactive group of the oligomer comprises OH or NH$_2$.

The linking group of the oligomer that links the radiation curable group and the isocyanate-reactive group is selected from the group consisting of alkyls, aryls, polyesters, polyethers, polycarbonates, polyacrylates and polymethacrylates. The chain length of the linking group varies with the desired molecular weight of the oligomer. Preferably, the linking group has a length and a solubility so as to provide a stabilization barrier to flocculation. A discussion of dispersion stabilization phenomena may be found in *Dispersion of Powders in Liquids* by G. D. Parfitt, John Wiley & Sons, NY, 1973.

A particularly preferred radiation curable oligomer is a polycaprolactone monoacrylate, with the following general formula:

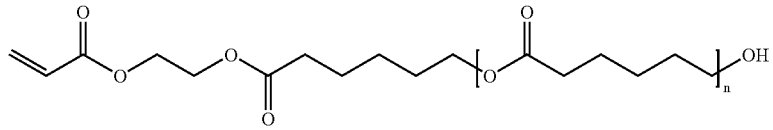

Preferably, the polycaprolactone monoacrylate shown above has a molecular weight of from about 1500 to about 5000 grams per mole, and n is about 10 to about 45. It can be prepared by the ring opening polymerization of caprolactone, initiated by a hydroxy acrylate such as hydroxyethyl acrylate. A similar radiation curable oligomer can be prepared using a hydroxy methacrylate, for example hydroxyethyl methacrylate, as the initiator for caprolactone polymerization.

Other useful radiation curable oligomers can be prepared by the ring opening polymerization of monoepoxy compounds, initiated by hydroxy (meth)acrylates or (meth) acrylic acid. For example, the polymerization of propylene oxide can be initiated using acrylic acid to give a polypropylene oxide monoacrylate:

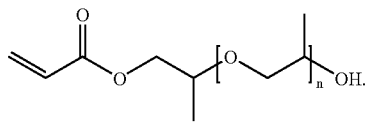

Similar reactions using ethylene oxide instead of propylene oxide, methacrylic acid instead of acrylic acid, and the like are also useful here.

Other useful radiation curable oligomers may be prepared through the partial reaction of compounds of molecular weight greater than about 1000 having more than one isocyanate-reactive group with radiation curable compounds having additional functionality capable of reacting with isocyanate-reactive groups. An example is the reaction of a diol such as polypropylene glycol of greater than about 1000 number average molecular weight with isocyanatoethyl methacrylate in a ratio so that about half of the hydroxyl groups are converted to urethane groups. In this case about half of the diol is converted to a radiation curable oligomer having isocyanate-reactive functionality and the rest is either unreacted or converted to a dimethacrylate.

Polar Component

The polar component of the present invention comprises at least one isocyanate-reactive group and at least one polar group.

The at least one isocyanate-reactive group of the polar component may independently comprise an alcohol group (OH), an amino group ($NH_2$) or a thiol group (SH). Preferably, the isocyanate-reactive group or groups of the polar component independently comprises OH or $NH_2$.

The at least one polar group is independently selected from the group consisting of nitrogen-containing groups, quaternary amino groups, sulfonic acid groups, sulfonic acid salt groups, carboxylic acid groups, carboxylic acid salt groups, phosphonic acid groups, phosphonic acid salt groups, phosphate groups, and phosphate salt groups.

Examples of useful polar components include, but are not limited to, heterocyclic nitrogen compounds including 2-amino-4-methylpyridine, 2-aminopyridine, 3-aminopyridine, 4-aminopyridine, 2-(aminomethyl)pyridine, 3-(aminomethyl)pyridine, 4-(aminomethyl)pyridine, 2-aminopyrimidine, 4-aminopyrimidine, aminopyrazine, aminopyrazole, 3-amino-1,2,4-triazole, 2-amino-1,2,4-thiadiazole, aminopyrrolidine, 2-amino-thiazole, hydroxyethylmorpholine, 2-(2-aminoethyl)pyridine, and 4-2-hydroxyethylpyridine as well as N,N-dimethylethylene diamine and N,N-dimethylethanolamine, and the like, polypropylene oxides terminated at one end with hydroxyl and at the other end with quaternary ammonium groups such as "EMCOL™ CC-42" sold by Eastech Chemical Corp., Philadelphia, Pa., bis-hydroxyalkyl esters of sulfoisopthalic acid and its salts, bis-hydroxymethyl propionic acid, its derivatives and their salts, phosphate mono- or diesters of polypropylene oxides or polyethylene oxides, and alkyl phosphonic acids and their salts.

The polar component may include two isocyanate-reactive groups. For example, a particularly preferred polar component comprises a sulfodiol of the following general formula:

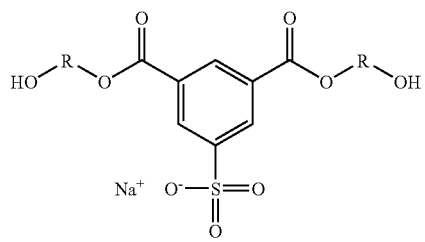

wherein R is selected from the group consisting of alkyls, aryls, polyesters, polyethers, and polycarbonates. A preferred material is:

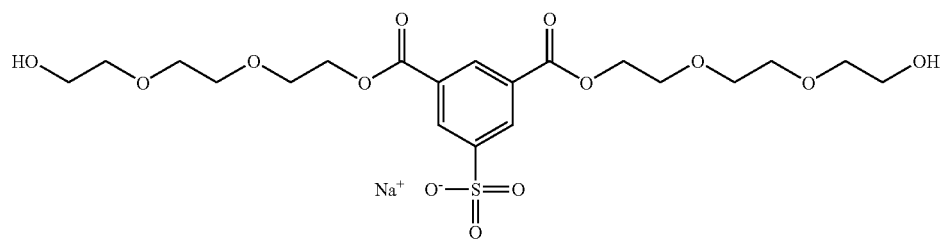

which is made by the transesterification reaction of dimethyl sulfoisophthalate, sodium salt, with triethylene glycol.

The present inventive composition may include two polar components. A particularly preferred embodiment of the inventive composition includes two polar components, in which one polar component is sulfodiol described above and a second polar component is a heterocyclic nitrogen compound selected from the group consisting of 2-amino-4-methylpyridine, 2-aminopyridine, 3-aminopyridine, 4-aminopyridine, 2-(aminomethyl)pyridine, 3-(aminomethyl) pyridine, 4-(aminomethyl)pyridine, 2-aminopyrimidine, 4-aminopyrimidine, aminopyrazine, aminopyrazole, 3-amino-1,2,4-triazole, 2-amino-1,2,4-thiadiazole, aminopyrrolidine, 2-amino-thiazole, hydroxyethylmorpholine, 2-(2-aminoethyl)pyridine, and 4-2-hydroxyethylpyridine as well as N,N -dimethylethylene diamine and N,N-dimethylethanolamine and the like.

Optional Difunctional Material

An optional component of the inventive composition is a difunctional material comprising two isocyanate-reactive groups and a linking group that links said two isocyanate-reactive groups.

The two isocyanate-reactive groups of the difunctional material may independently comprise an alcohol group (OH), an amino group (NH$_2$) or a thiol group (SH). Preferably, the isocyanate-reactive groups independently comprise OH or NH$_2$.

The linking group of the difunctional material is selected from the group consisting of alkyls, aryls, polyesters, polyethers, polycarbonates, polyacrylates, and polymethacrylates. The molecular weight of the linking group may preferably range from about 60 to about 1000 grams per mole.

Some examples of difunctional materials include, but are not limited to, diols and diamines.

Optional Monofunctional Material

Another optional component of the inventive composition is a monofunctional material comprising an oligomer having a molecular weight of about 100 grams per mole to about 5000 grams per mole, and one isocyanate-reactive group. More preferably, the oligomer of the monofunctional material has a molecular weight of about 1000 grams per mole to about 5000 grams per mole. This monofunctional material component does not include radiation curable groups.

The oligomer is selected from the group consisting of alkyls, aryls, polyesters, polyethers, polycarbonates, polyacrylates, and polymethacrylates.

The isocyanate-reactive group of the monofunctional material component may comprise an alcohol group (OH), an amino group (NH$_2$) or a thiol group (SH). Preferably, the isocyanate-reactive group comprises OH or NH$_2$.

Some examples of monofunctional materials include, but are not limited to, polyesters having one hydroxyl group and polyethers having one hydroxyl group. One particular example is polypropylenemonobutylether.

The monofunctional material may be made by methods described for the radiation curable oligomer, but using a non-radiation curable initiator such as butanol or octanol.

Preferred compositions of the present invention are acrylate functional polyester urethanes or polyether urethanes containing dispersing groups such as amine and carboxyl groups. These preferred compositions, or dispersants, are capable of producing stabilized pigment dispersions of organic pigments in UV curable acrylates such as, for example, tetrahydrofurfuryl acrylate (THFFA), 2-(2-ethoxyethoxy)ethyl acrylate (EEEA) and mixtures of THFFA, EEEA and isobornyl acrylate.

A particularly preferred composition of the present invention is a high molecular weight polycaprolactone acrylate that is shown by the following structure:

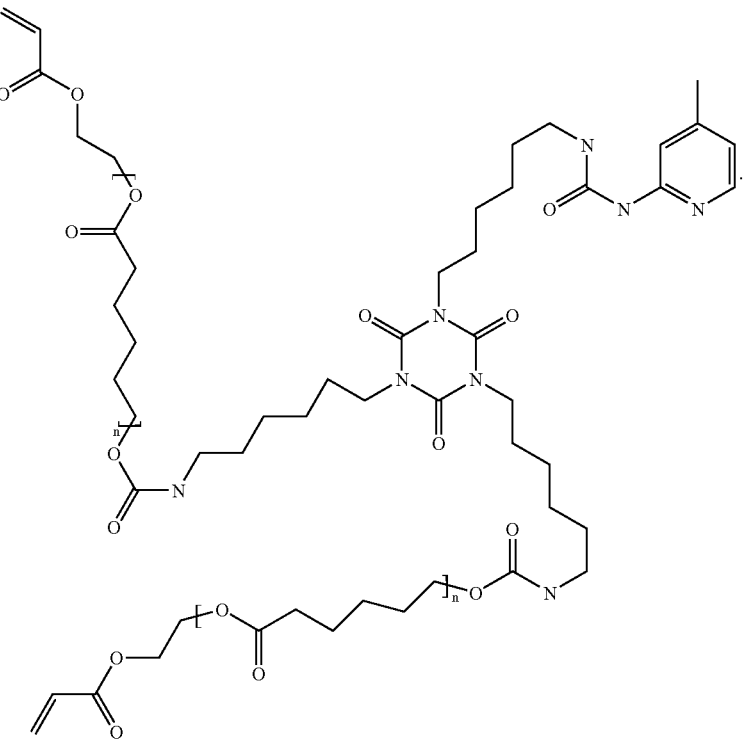

The composition of the present invention, including the high molecular weight polycaprolactone acrylate, may be made using techniques described in Example 1, or by other techniques that are well known in the art. (See, for example, Kirk-Othmer, *Encyclopedia of Chemical Technology*, 4$^{th}$ ed., vol. 24, pp. 695-726, John Wiley & Sons, NY, 1998).

The chemical composition may be made with or without solvent, but is preferably made without solvent. Catalysts known in the art may be used to make the composition. (See, for example, Kirk-Othmer, *Encyclopedia of Chemical Technology*, 4$^{th}$ ed., vol. 24, pp. 695-726, John Wiley & Sons, NY, 1998).

The components of the composition may be added together in any order. However, there may be compatibility differences in the composition depending upon the order of addition. Preferably, the polar component of the composition is added last, otherwise the solubility of the composition in the resulting ink or coating may be reduced.

The amounts of the components of the composition may vary. However, on average (meaning an average of all molecules of the composition) there is about one radiation curable group and about one polar group per molecule of the composition. Therefore:

(moles of radiation curable groups in the composition)/(total moles in composition)>1; and, (moles of polar groups in the composition)/(total moles in composition)>1.

On a weight percent basis, the components range approximately as follows: the at least one radiation curable oligomer ranges from about 40 to about 95 wt %, and preferably from about 70 to about 90 wt %; the polar component ranges from about 1 to about 30 wt %, and preferably about 2 to about 10 wt %; the polyisocyanate ranges from about 3 to about 30 wt %, preferably from about 10 to about 20 wt %; the optional difunctional material (when included) ranges from about 1 to about 30 wt %, preferably about 1 to about 10 wt %; and, the optional monofunctional component (when included) ranges from about 10 to about 50 wt %, preferably about 15 to about 30%.

In a preferred embodiment of the present inventive composition, the molar ratio of all of the isocyanate groups to all of the isocyanate-reactive groups is from about 0.5:1 to about 1:1. So, that preferably no unreacted isocyanate is present in the final product.

In general, the inventive composition, or dispersant, can be any molecular weight that proves useful in dispersing pigment particles to provide a stabilized dispersion. If the composition or dispersant is too low in molecular weight, it may not disperse and stabilize the pigment particles. On the other hand, too high of a molecular weight can tend to give an ink or coating that contains the composition, or dispersant, a relatively high viscosity, which could negatively affect the ability to apply the ink or coating. Preferred molecular weights of the composition, or dispersant, are typically in the range from between about 2,000 grams per mole to about 10,000 grams per mole (number average molecular weight), with the range from about 3,000 grams per mole to about 5,000 grams per mole being particularly preferred.

Inks and Coatings

Other embodiments of the present invention are inks and coatings that include the inventive composition, or dispersant. The inks and coatings comprise, in their simplest embodiment: the inventive composition; pigment particles; and at least one reactive diluent.

Pigment Particles

Suitable pigment particles of the inventive inks and coatings are pigment particles capable of being dispersed by the inventive dispersant in at least one reactive diluent. Many suitable pigments are known that are of different colors, particle sizes, compositions (e.g. organic or inorganic), surface characteristics, etc.

Colors of pigment particles include, for example, black, cyan, yellow, magenta, red and green. These colors are typical, but any other color of pigment particles may be used as well.

The pigment particles are preferred to be of a size sufficiently small to allow free flow of particles in inks or coatings. For example, in ink jettable inks, the particles are small enough to allow free flow through ink jet printing devices, especially at the nozzle. As for pigment particle size distribution, narrower size distributions are generally preferred.

Pigments useful in the invention may be organic or inorganic. Suitable inorganic pigments include, but are not limited to, carbon black and titania ($TiO_2$), while suitable organic pigments include, but are not limited to, phthalocyanines, antrhraquinones, perylenes, carbozoles, monoazo- and disazobenzimidazolones, isoindolinones, monoazonaphthols, diarylidepyrazolones, rhodamines, indigoids, quinacridones, diazopyranthrones, dinitranilines, pyrazolones, dianisidines, pyranthrones, tetrachloroisoindolinones, dioxazines, monoazoacrylides, and anthrapyrimidines. It will be recognized by those skilled in the art that organic pigments are differently shaded, or even have different colors, depending on the functional groups attached to the main molecule.

Commercial examples of useful organic pigments include, but are not limited to, those described in The Colour Index, Vols. 1-8, Society of Dyers and Colourists, Yorkshire, England having the designations Pigment Blue 1, Pigment Blue 15, Pigment Blue 15:1, Pigment Blue 15:2, Pigment Blue 15:3, Pigment Blue 15:4, Pigment Blue 15:6, Pigment Blue 16, Pigment Blue 24, and Pigment Blue 60 (blue pigments); Pigment Brown 5, Pigment Brown 23, and Pigment Brown 25 (brown pigments); Pigment Yellow 3, Pigment Yellow 14, Pigment Yellow 16, Pigment Yellow 17, Pigment Yellow 24, Pigment Yellow 65, Pigment Yellow 73, Pigment Yellow 74, Pigment Yellow 83, Pigment Yellow 95, Pigment Yellow 97, Pigment Yellow 108, Pigment Yellow 109, Pigment Yellow 110, Pigment Yellow 113, Pigment Yellow 128, Pigment Yellow 129, Pigment Yellow 138, Pigment Yellow 139, Pigment Yellow 150, Pigment Yellow 154, Pigment Yellow 156, and Pigment Yellow 175 (yellow pigments); Pigment Green 1, Pigment Green 7, Pigment Green 10, and Pigment Green 36 (green pigments); Pigment Orange 5, Pigment Orange 15, Pigment Orange 16, Pigment Orange 31, Pigment Orange 34, Pigment Orange 36, Pigment Orange 43, Pigment Orange 48, Pigment Orange 51, Pigment Orange 60, and Pigment Orange 61 (orange pigments); Pigment Red 4, Pigment Red 5, Pigment Red 7, Pigment Red 9, Pigment Red 22, Pigment Red 23, Pigment Red 48, Pigment Red 48:2, Pigment Red 49, Pigment Red 112, Pigment Red 122, Pigment Red 123, Pigment Red 149, Pigment Red 166, Pigment Red 168, Pigment Red 170, Pigment Red 177, Pigment Red 179, Pigment Red 190, Pigment Red 202, Pigment Red 206, Pigment Red 207, and Pigment Red 224 (red pigments); Pigment Violet 19, Pigment Violet 23, Pigment Violet 37, Pigment Violet 32, and Pigment Violet 42 (violet pigments); and Pigment Black 6 or 7 (black pigments).

The pigment is generally incorporated into the ink composition by milling the pigment into selected reactive monomers.

The percentage of an ink or coating that is made up of pigment particles depends upon the ink or coating, its use, etc. For example, with inks, the weight percentage of the pigment is about 1% to about 15%, for ink jettable inks and screen printing inks.

Reactive Diluent

The inventive inks and coatings include at least one reactive diluent. The reactive diluent preferably comprises one or more radiation curable monomer(s), oligomer(s), and/or polymer(s), and combinations thereof. Subject to desired performance standards, radiation curable monomer, oligomer, and/or polymer, or combinations thereof, may be incorporated into (which means mixed in but not reacted with) the reactive diluent.

The monomers, oligomers, and/or polymers of the reactive diluent may comprise mono-, di-, tri-, or tetra-functionality (in terms of radiation curable groups). One or more monomers are preferred, especially for ink jetting inks. These monomers function as diluents or solvents for the oligomer and other components (if any), as viscosity reducers, as binders when it is cured, and as crosslinking agents. The amount of these monomers to be incorporated into the reactive diluent varies with the invented use of the ink or coating. As a general guideline, the reactive diluent may comprise from about 25 to about 100, preferably 45 to 100, more preferably about 70 to 100 weight percent of these monomers.

Representative examples of monofunctional, radiation curable monomers suitable for use in the reactive diluent include, but are not limited to, styrene, alpha-methylstyrene, substituted styrene, vinyl esters, vinyl ethers, N-vinyl-2-pyrrolidone, (meth)acrylamide, N-substituted (meth)acrylamide, octyl (meth)acrylate, iso-octyl (meth)acrylate, nonylphenol ethoxylate (meth)acrylate, isononyl (meth) acrylate, ethyl diglycol (meth)acrylate, isobornyl (meth) acrylate, 2-(2-ethoxyethoxy)ethyl (meth)acrylate, 2-ethylhexyl (meth)acrylate, lauryl (meth)acrylate, butanediol mono(meth)acrylate, β-carboxyethyl (meth)acrylate, isobutyl (meth)acrylate, cycloaliphatic epoxide, α-epoxide, 2-hydroxyethyl (meth)acrylate, (meth)acrylonitrile, maleic anhydride, itaconic acid, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxy functional polycaprolactone ester (meth)acrylate, hydroxyetheryl (meth) acrylate, hydroxymethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofurfuryl (meth)acrylate, combinations of these, and the like.

Multifunctional radiation curable materials may also be incorporated into the reactive diluent to enhance one or more properties of the reactive diluent, including crosslink density, hardness, curing rate, and the like. If present, the reactive diluent may comprise up to about 1 to about 20 weight percent of these materials. Examples of these higher functional, radiation curable monomers include, but are not limited to, ethylene glycol di(meth)acrylate, hexanediol di(meth)acrylate, triethylene glycol di(meth)acrylate, tetraethylene glycol di(meth)acrylate, trimethylolpropane tri (meth)acrylate, ethoxylated trimethylolpropane tri(meth) acrylate, glycerol tri(meth)acrylate, pentaerythritol tri(meth) acrylate, pentaerythritol tetra(meth)acrylate, and neopentylglycol di(meth)acrylate, combinations of these, and the like.

Representative examples of preferred reactive diluent embodiments suitable in the practice of the present invention include the reactive diluent embodiments found in Assignee's Co-pending U.S. patent application Ser. Nos. 09/711,345 and 09/711,336.

In ink jettable inks, the reactive diluent may also optionally contain a solvent. The solvent can be any of a number of organic solvents known to be useful with pigmented inks or pigment dispersions. Representative examples of suitable organic cosolvents include, but are not limited to: alcohols such as methyl alcohol, ethyl alcohol, n-propyl alcohol, isopropyl alcohol, n-butyl alcohol, sec-butyl alcohol, t-butyl alcohol, iso-butyl alcohol, etc., ketones or ketoalcohols such as acetone, methyl ethyl ketone, diacetone alcohol, etc., esters such as ethyl acetate and ethyl lactate, polyhydric alcohols such as ethylene glycol, diethylene glycol, triethylene glycol, propylene glycol, butylenes glycol, 1,4-butanediol, 1,2,4-butantriol, 1,5-pentandiol, 1,2,6-hexantriol, hexylene glycol, glycerol, glycerol ethoxylate, trimethylopropane ethyoxylate; lower alkyl ethers such as ethylene glycol monomethyl or monoethyl ether, diethylene glycol methyl or ethyl ether and triethylene glycol monomethyl or monoethyl ether; nitrogen-containing compounds such as 2-pyrrolidinone and N-methyl-2-pyrrolidinone; sulfur-containing compounds such as dimethyl sulfoxide, tetramethylene sulfone, and thioglycol.

Optional Additives

In addition, the inks and coatings of the present invention may also include further additives to provide various properties. For example, a surfactant, useful for wetting and reducing the surface tension of an ink or coating, may be added to the ink or coating. Other additives include, but are not limited to, organic cosolvents, humectants, biocides, fungicides, defoamers, corrosion inhibitors, viscosity modifiers, pH buffers, penetrants, thickeners, thinners, catalysts, photoinitiators, UV absorbers, light stabilizers, other solvents, colorants, slip modifiers, thixotropic agents, foaming agents, antifoaming agents, flow or other rheology control agents, waxes, oils, plasticizers, binders, antioxidants, photoinitiator stabilizers, bactericides, organic and/or inorganic filler particles, leveling agents, opacifiers, antistatic agents, and the like.

The optional ingredients in the inventive inks and coatings are commercially available.

An advantage of at least one embodiment of the present invention is that when the inventive dispersant is used in a curable ink or coating, less photoinitiator may be used in the ink or coating. Less photoinitiator is desirable because photoinitiators are expensive and because they degrade the durability of a cured ink or coating.

The inks and coatings of the present invention can be prepared by mixing together the desired ingredients using any suitable technique. For example, in a one step approach, all of the ingredients are combined and blended, stirred, milled, or otherwise mixed to form a homogenous composition. Some techniques make use of ultrasonic energy to achieve mixing and particle deflocculation, while other methods use media mills such as ball mills, sand mills or attriators. Media mills achieve acceptable pigment dispersion by subjecting a pigment mixture to high intensity microshearing and cascading which breaks down agglomeration of the pigment particles. Homogenizers and emulsifiers can also be used for ink compounding. The conventional two-roll mill and three-roll mill processing technologies can be effective techniques for dispersing pigment particles if the materials can be formulated without highly viscous paste for processing, then followed by a let-down step to produce the final ink.

In general, the amounts of the ingredients in the inventive inks and coatings depend on a number of factors, including, for example, the type of the ingredients, the intended application of the ink or coating (substrate). Generally, pigment particles can be included in the ink or coating, e.g., in an amount in the range from about 1 to 15% weight of the ink. The amount of dispersant can be any effective amount, i.e., an amount effective to disperse the pigment particles and stabilize the dispersion. Generally, the amount of dispersant in the ink or coating depends on the amount of pigment particles. The amount of dispersant being, for example, an amount in the range from about 5 to about 200 weight percent of the pigment particles, with an amount in the range from about 20 to about 100 weight percent being preferred. Different color inks and coatings require different amounts of pigment particles and, therefore, need different amounts of dispersant. The dispersant is preferably present at levels from about 0.1 to about 20 weight percent of the overall ink or coating. The reactive diluent constitutes the remainder.

The inks and coatings of the present invention may be applied in any suitable fashion onto a receiving substrate such as retroreflective substrates, metal, paper, woven or nonwoven fabrics, resin-coated paper, foil, polymer articles, polymer films, and the like. Representative examples of coating techniques include, but are not limited to, screen printing, spraying, ink jetting, gravure coating, knife coating, roll coating, brushing, curtain coating, flexographic printing, offset printing, and the like. The inks and coatings of the present invention may be used to form graphic elements, text items, continuous layers, bar codes, three-dimensional structures, or other features. The inks and coatings of the present invention may also be used to print letters or other symbols or graphics, for example, on substrates. In addition, they may be used to coat an entire surface of a substrate. For example, they may be used to coat one major surface of a substrate that is used to make a road sign.

After being coated, the inks and coatings may be cured using a suitable fluent type of curing energy. The amount of curing energy to be used for curing depends upon a number of factors, such as the amount and the type of reactant involved, the energy source, web speed, the distance from the energy source, and the thickness of the material to be cured. Generally, the rate of curing tends to increase with increased energy intensity. The rate of curing also may tend to increase with increasing amounts of photocatalysts and/or photoinitiator being present in the composition. As general guidelines, actinic radiation typically involves a total energy exposure in the range from about 0.1 to about 10 J/cm$^2$, and electron beam radiation typically involves total energy exposure in the range from less than 1 megarad (Mrad) to 100 Mrads or more, preferably 1 to 10 Mrads. Exposure times may be from less than about 1 second up to 10 minutes or more. Radiation exposure may occur in air or in an inert atmosphere such as nitrogen.

The energy source, or curing means, used for achieving crosslinking of the radiation curable groups may be actinic (e.g. radiation having a wavelength in the ultraviolet or visible region of the spectrum), accelerated particles (e.g. electron beam radiation), thermal (e.g. heat or infrared radiation), or the like. Preferably, the energy is actinic radiation or accelerated particles, because such energy provides excellent control over the initiation and rate of crosslinking. Additionally, actinic radiation and accelerated particles can be used for curing at relatively low temperatures. This avoids degrading components that might be sensitive to the relatively high temperature that might be required to initiate crosslinking of the radiation curable groups when using thermal curing techniques. Suitable sources of actinic radiation include mercury lamps, xenon lamps, lasers, electron beam, carbon arc lamps, tungsten filament lamps, sunlight, and the like. Ultraviolet radiation, especially from medium pressure mercury lamps, is most preferred.

An advantage of at least one embodiment of the present invention is that the curability of the inventive inks and coatings are enhanced because of the inventive dispersant. The curability is especially enhanced, however, for curing that takes place in a non-inert or air atmosphere.

An additional advantage of at least one embodiment of the present invention is that the inks and coatings, including the inventive dispersant, are more easily and quickly cured, with less radiation being required to cure them. As a result of less radiation being required, the throughput times for production of cured inks and coatings on substrates may be decreased. This results in more efficient processes or methods for curing pigmented, curable inks and coatings.

Prior to curing, the present inventive inks and coatings preferably have one or more of these desirable features. Firstly, radiation curable inks and coatings preferably have sufficiently low viscosity so that the inks and coatings advantageously may be readily applied to receiving substrates.

In particular, ink jettable inks preferably have viscosities of below about 30 centipoise, more preferably below about 25 centipoise, and most preferably below about 20 centipoise at the desired ink jetting temperature (typically from ambient temperature up to about 65° C.). However, the optimum viscosity characteristics for a particular ink jettable ink depend upon the jetting temperature and the type of ink jet system that is used to apply the ink or coating to the substrate. A low viscosity generally helps the composition be jettable at the desired print head temperature. Due to potential volatility and reactivity of one or more components of radiation curable compositions, the inks or coatings preferably are jetted at temperatures no higher than about 65° C., and more preferably no higher than about 50° C.

A second preferable characteristic for radiation curable inks and coatings (before being cured) is that the inks and coatings have moderate to low surface tension. In particular, with regard to ink jettable inks, preferred formulations have surface tensions in the range of from about 20 dynes/cm to about 50 dynes/cm, more preferably in the range of from about 22 dynes/cm to about 40 dynes/cm at the printhead operating temperature.

Curable inks and coatings of the present invention, including the present inventive dispersants, also preferably have one or more desirable features when cured. Firstly, the preferred inks and coatings once cured are compatible with an extremely wide variety of porous and nonporous substrates. Some examples of porous substrates include, but are not limited to, paper, wovens and nonwovens. Some examples of nonporous substrates include, but are not limited to, bottles, and boxes. The compatibility with nonporous materials allows these compositions also to be applied onto a wide range of nonporous films, including polybutylene terephthalate, polyethylene terephthalate, other polyester, polyolefin, polymethyl (meth)acrylate, vinyl acetate, ABS, polyvinyl, polystyrene, high impact polystyrene, polycarbonate, polyurethane, epoxy, polyimide, polyamide, polyamideimide, polyacrylate, polyacrylamide, polyvinylchloride, combinations of these, and the like. Because radiation curing generates relatively little heat, the compositions of the present invention may be used on heat sensitive substrates, such as oriented films, for example.

The inventive inks and coatings when cured may have a wide range of elongation to break characteristics depending upon the intended use. For example, ink jettable inks may be characterized by an elongation to break of at least about 1%, preferably at least about 20%, more preferably from more than about 50% to about 300% or more, as desired. Cured ink jettable inks with elongation to break characteristics greater than about 50% are beneficially used to reduce stress cracks, improve toughness, and improve weatherability.

The inks and coatings of the present invention, when coated and cured, are substantially non-tacky and mar-resistant. "Tack-free" and "non-tacky" mean that the films are cured to the extent that they do not substantially grab and hold cotton fibers when the cotton-tipped end of an applicator stick is rubbed lightly across the surface. "Mar-resistant" or "abrasion resistant" mean that the film cannot be substantially marred or otherwise damaged by light rubbing of a wooden applicator stick across the surface. The inventive cured inks and coatings are, therefore, more durable, which helps the resultant articles including the inks or coatings maintain a better appearance.

Ink Jettable Inks

Specifically for use in ink jettable inks, an embodiment of the present invention is a dispersant comprising at least one radiation curable group and at least one polar group.

The at least one radiation curable group may be independently selected from the group consisting of (meth)acrylate groups, epoxy groups, olefinic carbon-carbon double bonds, allyloxy groups, alpha-ethyl styrene groups, (meth)acrylamide groups, cyanate ester groups, and vinyl ether groups.

The at least one polar group may be independently selected from the group consisting of nitrogen-containing groups, quaternary amino groups, sulfonic acid groups, sulfonic acid salt groups, carboxylic acid groups, carboxylic acid salt groups, phosphonic acid groups, phosphonic acid salt groups, phosphate groups, and phosphate salt groups.

Another embodiment of the present invention is an ink jettable ink comprising the dispersant described immediately above, pigment particles (described in earlier section of application), and at least one reactive diluent (also described in section above).

Articles

An additional embodiment of the present invention is an article comprising the ink or coating described above, which is applied to a substrate and exposed to a curing means. Yet another embodiment is an article comprising the ink jettable ink described above, which is applied to a substrate and exposed to a curing means. Exemplary substrates and curing means are also described above.

This invention is further illustrated by the following examples that are not intended to limit the scope of the invention. In the examples, all parts, ratios and percentages are by weight unless otherwise indicated. The following test methods were used to evaluate and characterize the printing ink with additives compositions produced in the examples. All materials are commercially available, for example from Aldrich Chemicals (Milwaukee, Wis.), unless otherwise indicated or described.

EXAMPLES

Test Methods

Features and advantages of this invention are further illustrated in the following Examples. It is to be expressly understood, however, that the particular ingredients and amounts used as well as other conditions and details are not to be construed in a manner that would unduly limit the scope of this invention.

All parts, percentages, and ratios in the following Examples are by weight unless otherwise specified.

Table 1 is a compilation of the materials used in these experiments.

TABLE 1

| Acronym/Name | Chemical Name | Source |
| --- | --- | --- |
| TONE ™ M-100 | 344 molecular weight caprolactone acrylate | Union Carbide, Danbury, CT |
| Caprolactone monomer | 6-hexanolactone | Aldrich Chemical Co., Milwaukee, WI |
| BHT | 2,6-di-ter-butyl-4-methylphenol | Aldrich Chemical Co. |
| TBTN | Titanium tetrabutoxide | Aldrich Chemical Co. |
| TOLONATE ™ HDT-LV | a trimer of hexamethylene diisocyanate | Rhodia Corporation, Cranbury, NJ |
| THFFA | Tetrahydrofurfuryl acrylate | Sartomer Co., Exton, PA |
| THFFA | Tetrahydrofurfuryl acrylate | San Esters Corporation, New York, NY |
| Oligomer 55 | | Method of making is described in Example 1 of U.S. Pat. App., Ser. No. 09/711,346 |
| EBECRYL ™ 8800 | | UCB Chemical, Smyrna, GA |
| TINUVIN ™ 292 | | Ciba Specialty Chemicals, Tarrytown, NY |
| IRGANOX ™ 819 | | Ciba Specialty Chemicals |
| IRGACURE ™ 651 | | Ciba Specialty Chemicals |
| IRGACURE ™ 184 | | Ciba Specialty Chemicals |
| EXXATE ™ 600 | | Exxon Chemical, Houston, TX |
| EFKA ™ 4046 | | EFKA Additives USA, Stow, OH |
| Camphorquinone | | Hampford Research, Inc., Stratford, CT |
| | N-vinyl caprolactam | BASF Corporation, Mount Olive, NJ |

TABLE 1-continued

| Acronym/Name | Chemical Name | Source |
| --- | --- | --- |
| EEEA | 2-(2-ethoxyethoxy)ethyl acrylate | Sartomer Co. |
| | Isobornyl acrylate | Sartomer Co. |
| | Hexanediol diacrylate | Sartomer Co. |
| | 2-amino-4-methyl pyridine | Aldrich Chemical Co. |
| | Dibutyltin dilaurate | Aldrich Chemical Co. |
| | Polypropylene glycol mono-butyl ether (1200 MW) | Aldrich Chemical Co. |
| TEG | Triethylene glycol | Aldrich Chemical Co. |
| DMSSIP | dimethyl sodium sulfoisophthalate | E. I. Du Pont de Nemours and Company, Wilmington, DE |
| ACCLAIM 3205 | Polypropylene glycol/polyethylene glycol diol | Bayer Corporation, Pittsburgh, PA |
| | Isocyanatoethyl methacrylate | Rhodia Corporation, Cranbury, NJ |
| IRGAZIN X-3367 | | Ciba Specialty Chemicals Corporation, High Point, NC |
| | 0.5 mm Yttria stabilized Zirconia media | Glen Mills, Inc., Clifton, NJ |
| SOLSPERSE 32000 | | Avecia Inc., Charlotte, NC |
| CHIVACURE TPO | A phosphine oxide | Chitec Chemical Company Ltd., Taipei, Taiwan |
| EBECRYL 4830 | Urethane acrylate oligomer | UCB Chemical |
| BPO | Benzophenone | |
| TEGORAD 2500 | | Degussa, Hopewell, VA |

Preparation of Curable Dispersants

Dispersant Example 1

A 2500 molecular weight (MW) polycaprolactone acrylate was prepared by charging to a 1 liter flask 124.8 g (0.36 moles) TONE™ M-100 and 776.2 g (6.81 moles) caprolactone monomer along with 0.45 g titanium tetrabutoxide and 0.25 g BHT. This mixture was heated for about 18 hours at 120° C. under dry air. The resulting 2500 MW polycaprolactone acrylate had a solids content of 97%.

To 42 g (0.0168 equivalents) of the 2500 MW polycaprolactone acrylate was added 1.82 g of 2-amino-4-methylpyridine (0.168 equivalents). To this mixture 6.15 g TOLONATE™ HDT-LV (0.0793) was added along with 1 drop of dibutyltin dilaurate. The reaction was stirred under dry air at 80° C. for 4 hours until no residual isocyanate groups remained as determined by infrared spectroscopy.

Dispersant Example 2

A 3000 MW polycaprolactone acrylate was prepared by charging to a 1 liter flask 57.3 g (0.167 moles) TONE™ M-100, 442.7 g (3.88 moles) caprolactone monomer, 0.25 g titanium tetrabutoxide and 0.125 g BHT were combined and reacted at 120° C. for about 18 hours under dry air. The percent solids of the resulting polycaprolactone acrylate 3000 was determined to be 95%.

Sulfodiol was prepared in a 500 ml 3 neck round bottom flask fitted with a water cooled distilling head, overhead mechanical stirrer, thermocouple, thermowatch, nitrogen inlet and heating mantle. The flask was charged with 250 g (3.33 equivalents) triethylene glycol (TEG) and 123.2 g (0.832 equivalents) dimethyl sodium sulfoisophthalate (DMSSIP). The materials were dried under full vacuum followed by heating to 75° C. for about 30 minutes. The temperature was then reduced and 0.2986 g titanium tetrabutoxide (TBTN) catalyst was added. The mixture was heated to 210° C. After approximately 24 g of distilled methanol was collected, the temperature was reduced to 75° C. and a vacuum was pulled. The temperature was subsequently increased to 125° C. and held for about 30 minutes until all bubbling had ceased. The resulting sulfodiol was transferred to a 500 ml glass jar.

To 79.3 g (0.0264 equivalents) of 3000 MW polycaprolactone acrylate and 3.38 g (0.0264 equivalents) of sulfodiol was added 67 g THFFA followed by 14.5 g TOLONATE™ HDT-LV (0.0793 equivalents) and 1 drop dibutyltin dilaurate. The reaction was stirred under dry air at 65° C. for about 6 hours and 2.85 g 2-amino-4-methylpyridine (0.0264 equivalents) was added. After 30 minutes at 65° C., there was no isocyanate remaining as determined by infrared spectrometry.

Dispersant Example 3

In a 1 liter flask, 50.0 g ethyl acetate was added to 98.8 g (0.0823 equivalents) polypropylene glycol mono-butyl ether (1200 MW from Aldrich Chemical Co., Milwaukee, Wis.) and 21.1 g (0.1646 equivalents) of sulfodiol (as described in Example 2). The ethyl acetate was distilled off to remove residual water. 90.4 g TOLONATE™ HDT-LV (0.494 equivalents) and 2 drops dibutyltin dilaurate were then added. The mixture was held at 80° C. under dry nitrogen for about 18 hours whereupon the atmosphere was switched to dry air and 237 g isobornyl acrylate, 237 g 2-(2-ethoxyethoxy)ethyl acrylate, and 100 mg BHT were added followed by 247 g (0.082 equivalents) of 3000 MW polycaprolactone acrylate (as described in Example 2). The mixture was held at 80° C. for about 3 hours then 17.8 g (0.165 equivalents) 2-amino-4-methylpyridine was added. After about 45 minutes, a trace of isocyanate remained (as determined by infrared spectroscopy) so 1.0 g ethanol was added to consume the remaining isocyanate during an additional hour of reaction time.

Dispersant Example 4

The procedure outlined in Example 2 was followed substituting an equal number of equivalents of triethylene glycol for the sulfodiol.

Dispersant Example 5

To a 3 liter flask, 100 g ethyl acetate was added to 1011 g (0.64 equivalents) ACCLAIM 3205 (polypropylene glycol/polyethylene glycol diol). The ethyl acetate was distilled off to remove residual water. 58.6 g (0.38 equivalents) Isocyanatoethyl methacrylate, 100 mg BHT and 3 drops of dibutyltin dilaurate were added. The mixture was held at 60° C. under dry air for 1 hour whereupon no residual isocyanate was detected by infrared spectroscopy. 800 g Tetrahydrofuran was added followed by 98.6 g (0.56 equivalents) TOLONATE™ HDT-LV. The mixture was heated for 3 hours at 60° C. 31.3 g (0.29 equivalents) 2-amino-4-methylpyridine was then added and heating was continued at 60° C. for 1 hour whereupon infrared spectroscopy showed that only a trace of isocyanate remained. 2.0 g Ethanol was added to consume the remaining isocyanate during an additional hour of reaction at 60° C. The solvent was distilled off at 40° C. under vacuum and 300 g of 2-(2-ethoxyethoxy)ethyl acrylate were added to provide the final dispersant solution.

Comparative Dispersant Example 1

A 1000 MW polycaprolactone acrylate was prepared by charging to a 1 liter flask 309.6 g (0.0900 equivalents) TONE™ M-100, 590.4 g (5.179 equivalents) caprolactone monomer, 0.45 g titanium tetrabutoxide and 0.25 g BHT. The mixture was heated for about 18 hours at 120° C. under dry air. The resulting product was determined to be 97% solids.

To 33.9 g of the 1000 MW polycaprolactone acrylate was added, 3.66 g (0.339 equivalents) 2-amino-4-methylpyridine and 12.4 g (0.067 equivalents) TOLONATE™ HDT-LV and 1 drop dibutyltin dilaurate. The reaction was stirred under dry air at 80° C. for about 4 hours. No residual isocyanate groups remained as determined by infrared spectroscopy.

Preparation of Dispersions

General Method: 10 g of 0.3 mm ceramic milling media from SEPR Corp., 10 g THFFA, 0.5 g pigment and 0.5 g dispersant were combined in a 4 dram vial and rolled at approximately 10 rpm for about 3 days. The resulting dispersions were removed from the roller and monitored for sedimentation over a period of days.

TABLE 2

| Dispersion Example | Dispersant Example | Color | Results |
|---|---|---|---|
| 1 | 1 | Pigment Yellow 150 | Good after one week |
| 2 | 1 | Pigment Red 202 | Good after one week |
| 3 | 1 | Pigment Red 179 | Good after one week |
| 4 | 1 | Pigment Red 224 | Good after one week |
| 5 | 1 | Pigment Black 7 | Good after one week |
| 6 | 1 | Pigment Black 4 | Good after one week |
| 7 | 1 | Pigment Green 7 | Good after one week |
| 8 | 1 | Pigment Blue 15:3 | Weak flocculation |
| 9 | Comp. Ex. 1 | Pigment Yellow 150 | Weak flocculation |
| 10 | Comp. Ex. 1 | Pigment Blue 15:3 | Weak flocculation |
| 11 | Comp. Ex. 1 | Pigment Red 179 | Strong flocculation |
| 12 | Comp. Ex. 1 | Pigment Red 224 | Weak flocculation |
| 13 | Comp. Ex. 1 | Pigment Black 7 | Good after one week |
| 14 | Comp. Ex. 1 | Pigment Black 4 | Strong flocculation |
| 15 | Comp. Ex. 1 | Pigment Green 7 | Weak flocculation |
| 16 | Comp. Ex. 1 | Pigment Blue 15:3 | Strong flocculation |

Dispersion Example 17

20 g of dispersant (Example 1) was mixed with 50 g THFFA in a high shear mixer with a COWLES™ blade mixer as 30 g Pigment Red 202 was added slowly. The resulting dispersion was smooth and low viscosity.

Dispersion Example 18

16.5 g dispersant (Example 2) was mixed with 23.7 g THFFA in a high shear mixer (@1500 rpm) with a COWLES™ blade mixer as 19.8 g Pigment Red 202 was added slowly. After the pigment was added, 35 g of 0.3 mm ceramic milling media were added and mixing was continued at 2000 rpm for about 30 minutes. 5.0 g THFFA was added to bring the pigment loading to 30% and mixing was stopped. A smooth dispersion was observed that was stable on standing.

Dispersion Example 19

11.7 g dispersant (Example 3) was mixed with 40.8 g THFFA in a high shear mixer (@1500 rpm) with a COWLES™ blade mixer as 17.5 g Pigment Red 202 was added slowly. After the pigment was added, 50 g of 0.3 mm ceramic milling media were added and mixing was continued at 2000 rpm for about 30 minutes. A smooth dispersion was observed that was stable on standing.

Dispersion Example 20

A dispersion was prepared as described in Dispersion Example 18 above with the exception that the dispersant from Example 4 was used instead of Example 2. The resulting magenta pigment dispersion was smooth and had a low viscosity when shear mixing. The dispersion set to a soft gel, reversible by shear mixing, within about 30 minutes of shear cessation.

Dispersion Example 21

A dispersion of Ciba IRGAZIN X-3367 was prepared in tetrahydrofurfuryl acrylate (San Esters Corporation, New York, N.Y.) using the dispersant from Dispersant Example 5. The dispersant (192 g) was dissolved in the THFFA (488 g) to yield a solution. The dry IRGAZIN X-3367 pigment powder (160 g) was then mixed into the solution by hand. The resulting mixture was then processed on a Hockmeyer Micromill HM-1/16$^{th}$ (available from Hockmeyer Equipment Corporation, Harrison, N.J.) charged with 45 cc of 0.5 mm Yttria stabilized Zirconia media for 90 minutes at 100% speed. The resulting dispersion was a viscous liquid.

Comparative Dispersion Example 1

A dispersion of Ciba IRGAZIN X-3367 was prepared in tetrahydrofurfuryl acrylate (San Esters Corporation, New York, N.Y.) using SOLSPERSE 32000. The dispersant (32 g) was melted and added to THFFA (608 g) to yield a solution of the dispersant. The dry IRGAZIN X-3367 pigment powder (160 g) was then mixed into the solution by hand. The resulting mixture was then processed on a Hockmeyer Micromill HM-1/16$^{th}$ charged with 45 cc of 0.5 mm Yttria stabilized Zirconia media for 170 minutes at 100% speed. The resulting dispersion was a viscous liquid.

Preparation of Inks

Ink Example 1

The dispersant from Example 1 (65 g) was dissolved in 195 g THFFA at room temperature overnight. The solution was then combined with 150 g isobornyl acrylate and 150 g 2-(2-ethoxyethoxy)ethyl acrylate to yield a viscous solution of the dispersant. Pigment Green 7 (125 g) was incorporated into this solution using an air motor disperser to yield a free flowing dispersion. The dispersion was then processed on a NETZSCH™ Mini-Zeta mill (Netzsch Incorporated, Lionville, Pa.) and charged with 0.5 mm yttrium-stabilized zirconium oxide media (available from Glen Mills, Clifton, N.J.) for a period of about 3 hours. The resulting dispersion was a free pumping fluid having a flow rate of 6 grams/second at the end of the processing time.

Comparative Ink Example 1

A green pigment dispersion was prepared as described above using the non-reactive dispersant, EFKA™ 4046 in place of the dispersant from Example 1.

The green pigment dispersions comprising the reactive dispersant from Example 1 and the non-reactive EFKA™ 4046 were then formulated into radiation curable inks according to the table below.

TABLE 3

| Component | Ink Example 1 (wt %) | Comp. Ink Example 1 (wt %) |
| --- | --- | --- |
| Pigment Green 7 | 9.75 | 9.3 |
| Dispersant | 4.9* | 4.9** |
| THFFA | 10.0 | 20.0 |
| 2-(2-ethoxyethoxy)ethyl acrylate | 21.0 | 16.0 |
| Isobornyl acrylate | 21.0 | 15.5 |
| Oligomer 55 | 10.0 | 10.0 |
| EBECRYL ™ 8800 | 6.0 | 6.0 |
| Hexanediol diacrylate | 8.0 | 8.0 |
| N-vinyl caprolactam | 7.0 | 7.0 |
| TINUVIN ™ 292 | 2.0 | 2.0 |
| IRGACURE ™ 651 | 2.0 | 2.0 |
| IRGACURE ™ 184 | 1.0 | 1.0 |
| IRGANOX ™ 819 | 3.0 | 3.0 |
| Camphorquinone | 0.5 | 0.5 |

*Dispersant from Example 1
**EFKA ™ 4046

The formulated inks were cast on 3M™ SCOTCHLITE™ 3870 High Intensity sheeting (available from 3M Company, St. Paul, Minn.) using a US #8 wire wound Meyer bar (available from RD Specialties, Inc., Webster, N.Y.) to give a nominal wet film thickness of 8 microns. The inks were then cured using an RPC™ UV processor (available from RPC Industries, Plainfield, Ill.) equipped with 2 medium pressure Hg bulbs under a 1.59 mm thick plate of PYREX™ 7740 glass (available from Corning Inc, Corning, N.Y.) in both nitrogen inerted and air environments. The curing was complete in one pass under the lamps at 29 m/minute at a total UV-A dose of 249 mJ/cm$^2$ as measured with an EIT™ Power Puck high energy integrating radiometer (EIT Inc., Sterling, Va.). The cured ink prepared using the reactive dispersant from Example 1 were smooth, glossy, non-tacky and showed improved mar resistance when compared to the cured ink prepared using the non-reactive EFKA™ 4046.

Ink Example 2

A mixture of BPO (2.1 parts by weight), CHIVACURE TPO (2.1 parts by weight), Tegorad 2500 (0.2 parts by weight) and EBECRYL 4830 (9.6 parts by weight) was made in the THFFA (62.7 parts by weight) to yield a clear solution. The dispersion (23.4 parts by weight) from Dispersion Example 21 was then charged and blended by hand with the clear solution. The formulation was filtered through Roki HT-60 filter cartridges (available from Roki Techno Co, Inc. Tokyo, Japan) under positive air pressure. The filtered liquid was collected and used for casting and jetting evaluation.

Comparative Ink Example 2

A mixture of BPO (2.1 parts by weight), CHIVACURE TPO (2.1 parts by weight), Tegorad 2500 (0.2 parts by weight) and EBECRYL 4830 (9.7 parts by weight) was made in the THFFA (63.2 parts by weight) to yield a clear solution. The dispersion (22.7 parts by weight) from Comparative Dispersion Example 1 was then charged and blended by hand with the clear solution. The formulation was filtered through Roki HT-60 filter cartridges (available from Roki Techno Co, Inc. Tokyo, Japan) under positive air pressure. The filtered liquid was collected and used for casting and jetting evaluation.

Samples of each of the inks from Ink Example 2 and Comparative Ink Example 2 were cast onto SCOTCHCAL™ 180-10 film (available from 3M Company, Maplewood, Minn.) using a #6 wire wound rod (available from RDS Specialties) to yield a wet film thickness of approximately 6 microns. These films were then cured using one pass through an RPC UV processor (available from RPC Industries, Plainfield, Ill.) using two medium pressure Mercury bulbs on high power in a nitrogen atmosphere at a line speed or 30.5 meters per minute (100 ft/min). Both inks cured to a smooth glossy ink layer on the SCOTCHCAL™ film.

The cured ink layers on the SCOTCHCAL™ film were then tested for abrasion resistance by scratching with a cotton-tipped applicator using moderate pressure. The ink layer of the cured ink from Ink Example 2 containing the curable dispersant of the invention showed a higher abrasion resistance than the ink layer of the ink from Comparative Ink Example 2 containing the SOLSPERSE 32000 dispersant. The ink layer containing the SOLSPERSE was scratched off the SCOTCHCAL™ 180-10 film, whereas at the same pressure the ink layer made from the ink of Ink Example 2 did not scratch off the SCOTCHCAL™ 180-10 film.

Samples of both inks from Ink Example 2 and from Comparative Ink Example 2 were ink jet printed (jetted) onto two print media—SCOTCHCAL™ 180-10 film and paper. The inks were printed using a Spectra Galaxy 30 Picoliter Printhead (available from Spectra Inc., Lebanon, N.H.) at a single pass resolution of 315.5×305.4 dpi. The print head temperatures were 38° C. (101° F.) for the ink from Comparative Ink Example 2 and at 45° C. (113° F.) for the ink from Ink Example 2. The substrate was translated in the 305.4 dpi direction under the stationary print head using an x-y translation stage.

Five images of print test patterns were ink jet printed using each ink. The images were cured using one pass through an RPC UV processor (available from RPC Industries, Plainfield, Ill.) using two medium pressure Mercury bulbs on high power in a nitrogen atmosphere at a line speed of 30.5 meters per minute (100 ft/min). Test patterns of both inks cured to a smooth glossy ink layer.

Both ink formulations jetted acceptably giving good quality images on both SCOTCHCAL 180-10 film and paper.

Various modifications and alterations of this invention will become apparent to those skilled in the art without departing from the scope and principles of this invention, and it should be understood that this invention is not to be unduly limited to the illustrative embodiments set forth hereinabove.

What is claimed:

1. A composition comprising a polycaprolactone acrylate represented by the following structure:

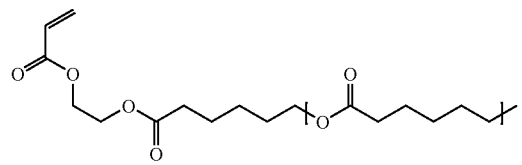

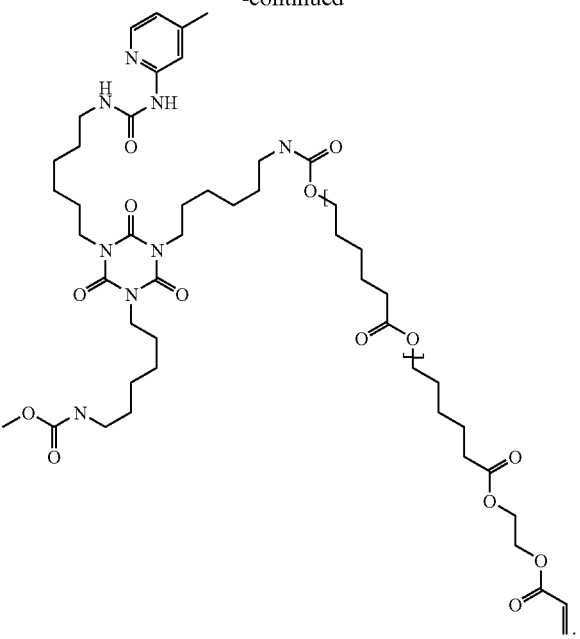

2. A composition comprising the reaction product of:

a. a polyisocyanate;
b. at least one radiation curable oligomer having the formula:

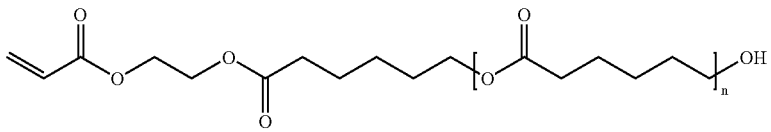

wherein said oligomer has a number average molecular weight of from about 1500 to about 5000 grams per mole, and wherein n is about 10 to about 45; and
c. at least one polar component comprising at least one isocyanate-reactive group and at least one polar group.

3. A composition comprising the reaction product of:

a. a polyisocyanate;
b. at least one radiation curable oligomer comprising a polycaprolactone acrylate having the following structure:

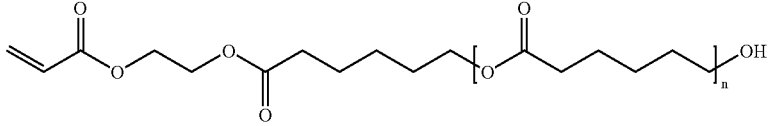

wherein said polycaprolactone acrylate has a number average molecular weight of from about 1500 to about 5000 grams per mole, and wherein n is about 10 to about 45; and c. at least one polar component comprising at least one isocyanate-reactive group and at least one polar group, wherein the reaction product comprises molecules that have an average of one polar group per molecule.

4. The composition according to claim 3, wherein the composition further comprises pigment particles and at least one reactive diluent.

5. The composition according to claim 3, wherein the at least one polar component is selected from the group consisting of 2-amino-4-methyl pyridine, 2-aminopyridine, 3-aminopyridine, 4-aminopyridine, 2- (aminomethyl)pyridine, 3-(aminomethyl)pyridine, 4-(aminomethyl)pyridine, 2-aminopyrimidine, 4-aminopyrimidine, aminopyrazine, aminopyrazole, 3-amino-1,2,4-triazole, 2-amino-1,2,4-thiadiazole, aminopyrrolidine, 2-amino-thiazole, hydroxyethyl-morpholine, 2-(2-aminoethyl)pyridine, 4-2-hydroxyethylpyridine, N,N-dimethylethylene diamine, and N,N-dimethyl-ethanolamine.

6. The composition according to claim 3, wherein the at least one polar component comprises a sulfodiol and said composition comprises a second polar component that is selected from the group consisting of 2-amino-4-methyl pyridine, 2-aminopyridine, 3-aminopyridine, 4-aminopyridine, 2-(aminomethyl)pyridine, 3-(aminomethyl)pyridine, 4-(aminomethyl)pyridine, 2-aminopyrimidine, 4-aminopyrimidine, aminopyrazine, aminopyrazole, 3-amino-1,2,4-triazole, 2-amino-1,2,4-thiadiazole, aminopyrrolidine, 2-amino-thiazole, hydroxyethylmorpholine, 2-(2-aminoethyl)pyridine, 4-2-hydroxyethylpyridine, N,N-dimethylethylene diamine, and N,N-dimethyl-ethanolamine.

7. An ink jettable ink comprising a composition according to claim 3.

8. An article comprising the ink of claim 7, applied to a substrate, and exposed to a curing means.

9. A composition comprising the reaction product of:
a. a polyisocyanate;
b. at least one radiation curable oligomer comprising at least one radiation curable group, wherein said oligomer has a number average molecular weight of greater than about 1000 grams per mole; and
c. at least one polar component that is selected from the group consisting of 2-amino-4-methyl pyridine, 2-aminopyridine, 3-aminopyridine, 4-aminopyridine, 2-(aminomethyl)pyridine, 3-(aminomethyl)pyridine, 4-(aminomethyl)pyridine, 2-aminopyrimidine, 4-aminopyrimidine, aminopyrazine, aminopyrazole, 3-amino-1,2,4-triazole, 2-amino-1,2,4-thiadiazole, aminopyrrolidine, 2-amino-thiazole, hydroxyethylmorpholine, 2-(2-aminoethyl)pyridine, 4-2-hydroxyethylpyridine, N,N-dimethylethylene diamine, and N,N-dimethyl-ethanolamine, wherein the reaction product comprises molecules that have an average of one polar group per molecule.

10. The composition according to claim 9, wherein the composition further comprises pigment particles and at least one reactive diluent.

11. The composition according to claim 9, wherein the at least one radiation curable oligomer comprises a polycaprolactone acrylate having the following structure:

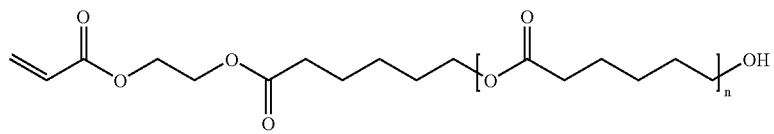

wherein said polycaprolactone acrylate has a number average molecular weight of from about 1500 to about 5000 grams per mole, and wherein n is about 10 to about 45.

12. An ink jettable ink comprising a composition according to claim 9.

13. An article comprising the ink of claim 12, applied to a substrate, and exposed to a curing means.

14. A composition comprising the reaction product of:
a. a polyisocyanate;
b. at least one radiation curable oligomer comprising at least one radiation curable group, wherein said oligomer has a number average molecular weight of greater than about 1000 grams per mole; and
c. at least one polar component comprising a sulfodiol and said composition comprises a second polar component that is selected from the group consisting of 2-amino-4-methyl pyridine, 2-aminopyridine, 3-aminopyridine, 4-aminopyridine, 2-(aminomethyl)pyridine, 3-(aminomethyl)pyridine, 4-(aminomethyl)pyridine, 2-aminopyrimidine, 4-aminopyrimidine, aminopyrazine, aminopyrazole, 3-amino-1,2,4-triazole, 2-amino-1,2,4-thiadiazole, aminopyrrolidine, 2-amino-thiazole, hydroxyethylmorpholine, 2-(2-aminoethyl)pyridine, 4-2-hydroxyethylpyridine, N,N-dimethylethylene diamine, and N,N-dimethyl-ethanolamine, wherein the reaction product comprises molecules that have an average of one polar group per molecule.

15. The composition according to claim 14, wherein the composition further comprises pigment particles and at least one reactive diluent.

16. The composition according to claim 14, wherein the at least one radiation curable oligomer comprises a polycaprolactone acrylate having the following structure:

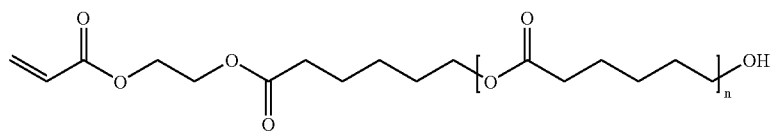

wherein said polycaprolactone acrylate has a number average molecular weight of from about 1500 to about 5000 grams per mole, and wherein n is about 10 to about 45.

17. An ink jettable ink comprising a composition according to claim 14.

18. An article comprising the ink of claim 17, applied to a substrate, and exposed to a curing means.

* * * * *

UNITED STATES PATENT AND TRADEMARK OFFICE
CERTIFICATE OF CORRECTION

PATENT NO. : 7,288,591 B2
APPLICATION NO. : 10/489983
DATED : October 30, 2007
INVENTOR(S) : James G. Carlson It is certified that error appears in the above-identified patent and that said Letters Patent is hereby corrected as shown below:

Column 5
Line 18, delete "diioscyanate." and insert -- diisocyanate --, therefor.

Column 9
Line 15, delete "N -" and insert -- N- --, therefor.
Line 16, before "and" insert -- , --.

Column 12
Line 24, delete "antrhraquinones," and insert -- anthraquinones, --, therefor.

Column 23
Line 29, delete "6" and insert -- ~6 --, therefor.

Signed and Sealed this

Sixth Day of May, 2008

JON W. DUDAS
*Director of the United States Patent and Trademark Office*